United States Patent Office 3,218,368
Patented Nov. 16, 1965

3,218,368
PROCESS FOR THE PREPARATION OF
UNSATURATED HYDROCARBONS
Roderick Frank Neale, Great Bookham, England, assignor to The Distillers Company Limited, Edinburgh, Scotland, a British company
No Drawing. Filed Aug. 20, 1962, Ser. No. 218,156
Claims priority, application Great Britain, Sept. 14, 1961, 32,927/61
12 Claims. (Cl. 260—683.3)

This invention relates to the production of alkenes from alkanes.

According to the present invention the process for the production of an alkene as hereinafter defined comprises reacting an alkane, the molecule of which contains at least a chain of two carbon atoms, at an elevated temperature in the vapour phase, with molecular oxygen over an oxidation catalyst comprising an oxide of vanadium alone or in combination or admixture with an oxide of at least one of the metals tin, cobalt, chromium, manganese, uranium, tungsten, lead, bismuth and zinc.

The catalysts used in the process of the present invention must include an oxide of vanadium, e.g., vanadium pentoxide and may include in addition an oxide of at least one of the above specified metals. The catalyst may thus take the form of a mixture of metal oxides or of a compound or compounds of vanadium, one of the other specified metals and oxygen, e.g., tin vanadate, cobalt vanadate, chromium vanadate, vanadyl chromate, uranyl vanadate, vanadyl uranate, manganese vanadate, tungsten vanadate, vanadyl tungstate zinc vanadate, lead vanadate and bismuth vanadate. Under the reaction conditions the mixed metal catalyst may be present in either or both forms. The catalyst may also contain other metals or metal salts known to act as catalyst promoters, e.g., the metals iron, potassium, cerium, nickel or cobalt or the oxides or salts thereof. These additives may be added in in the form of heat decomposable salts, e.g., ferric nitrate.

The catalysts may be prepared in any suitable manner, for example by intimate admixture of the oxides. Alternatively the catalyst may be prepared by precipitation, for instance, by adding an aqueous solution of a cationic salt of the desired metal, e.g., chromium nitrate, to an aqueous solution or suspension of an anionic vanadium acid salt, e.g., ammonium vanadate and recovering the resulting precipitate.

The catalysts may be deposited on an inert support material such as silica, alumina or a diatomaceous earth, e.g., Celite* if desired. For example alumina may be impregnated with a mixed solution of heat decomposable salts of the desired metal and vanadium, e.g., the oxalates and the resulting mixture heated to dryness whereupon the oxalates are decomposed into the oxides.

The catalyst supports may be subjected to a pre-heat treatment before deposition of the catalyst. However the use of an unheated alumina support is preferred.

In the process of this invention, an alkane, the molecule of which contains at least a chain of two carbon atoms, in admixture with molecular oxygen, is brought into contact with the catalyst in any suitable manner, for example in a fixed or fluidised bed or adiabatic reactor. Suitable alkane starting materials may be ethane, propane, n-butane, isobutane, isopentane or dodecane. The use of ethane or n-butane is preferred resulting in the production of ethylene or n-butylene respectively. The concentration of alkane in the feed may vary within fairly wide limits, and may suitably be, for example, about 10% by volume.

*Registered trademark.

The concentration of oxygen in the reaction mixture may vary within fairly wide limits, and may suitably be, for example, about 10% by volume. The feed may also contain a gaseous diluent which is preferably substantially inert under the conditions of the reaction, and which may be, for example, nitrogen and/or steam. It is preferred to use a mixture of nitrogen and steam as diluent, and the oxygen may thus conveniently be supplied in the form of air.

The reaction may suitably be carried out at temperatures in the range 400 to 650° C. The contact time may be, for example, within the range 1 to 30 seconds. The reaction may be carried out at atmospheric pressure, superatmospheric pressure or subatmospheric pressure.

The reaction may yield mono-olefines or di-olefines or both and the term "alkene" means hereinafter mono- or di-olefines.

The alkene (formed in reaction according to this invention) may be recovered by any suitable means, for example by extraction into a solvent, or by liquefaction, if necessary with freezing and fractionation of the product.

The process of the invention is illustrated further by the following examples where parts referred to are intended as parts by weight.

Example 1

15 parts of oxalic acid dehydrate was added to 2.8 parts of chromium trioxide in 4 parts of cold water and the resulting solution mixed with a solution of vanadyl oxalate, obtained by warming 2.5 parts of vanadium pentoxide in 4 parts of water with 25 parts of oxalic acid dehydrate.

The mixed oxalate solution was added at 90° C. with stirring, to granular alumina (6–16 mesh) which was then dried at 100° C. The catalyst was finally heated at 400° C. for 16 hours in a stream of air to decompose the oxalates.

A gaseous mixture of 9.6% by volume of n-butane, 9.6% by volume of oxygen, 38.4% by volume of nitrogen, and 42.4% by volume of steam was passed over the catalyst in a reactor at 450° C., the contact time being 4 seconds.

The organic part of the reactor exit gas possessed the following composition n-butane 84.6%, iso-butane 3.7%, butene-1 2.8%, butene-2 7.0%, butadiene 1.9%.

Example 2

Cobaltous nitrate hexahydrate (58.2 parts) was dissolved in hot water (40 parts) and added with stirring to a hot solution of ammonium metavanadate (46.8 parts) in water (1000 parts). The resulting precipitate was filtered off, washed and dried at 105° C. for 16 hours. The solid was then ground down to pass 30 BSS mesh admixed with 2% w./w. graphite, pelleted and heated at 400° C. in air for 16 hours.

A gaseous mixture of 9.5% by volume of n-butene, 9.5% by volume of oxygen, 37.8% by volume of nitrogen, and 43.2% by volume of steam was passed over the catalyst in a reactor at 504° C. the contact time being 4 seconds.

The organic part of the reactor exit gas was of the following composition n-butane 88.2%, isobutane 1.5%, butene-1 2.9%, butene-2 7%, butadiene 0.4%.

Example 3

A gaseous mixture of 10% by volume of ethane, 10% by volume of oxygen, 40% by volume of nitrogen, and 40% by volume of steam was passed over a cobalt vanadate catalyst prepared as described in Example 2 above contained in a reactor at 549° C. the contact time being 4 seconds. The yield of ethylene based on ethane fed was 9.3%.

Example 4

8 parts of oxalic acid dihydrate were added slowly and portion wise to 1.2 parts of chromium trioxide in 4 parts cold water and the resulting solution mixed with solutions of vanadyl oxalate, obtained by warming 1.1 parts of vanadium pentoxide in 4 parts of water with 12 parts of oxalic acid dihydrate, and ferric nitrate monohydrate (1 part) in water (2 parts). The combined solutions were added at 80°, with stirring, to 6–16 mesh granular alumina (100 parts), which was then dried at 100°. The catalyst was finally heated at 400° C. for 16 hours in a stream of air to decompose the oxalates, excess oxalic acid and ferric nitrate.

A gaseous mixture of 10.1% by volume of n-butane, 9.8% by volume of oxygen, 40.1% by volume of nitrogen and 40.0% by volume of steam was passed over the catalyst in a reactor at 554°, the contact time being 4 seconds.

The organic part of the reactor exit gas possessed the following composition n-butane 83.6%, isobutane 1.4%, butene-1 3.9%, butene-2 8.4% butadiene 2.5%.

Example 5

A gaseous mixture of 9.8% by volume of ethane, 9.8% by volume of oxygen, 39.4% by volume of nitrogen, and 41% by volume of steam was passed over a catalyst prepared as described in Example 4 above and contained in a reactor at 550° C., the contact time being 4 seconds. The yield of ethylene based on ethane fed was 13.3%.

Example 6

A solution of 100 parts uranyl nitrate hexahydrate in 100 parts water was added slowly to a stirred solution of 46 parts ammonium vanadate in 1000 parts water at 90°. The precipitated uranyl vanadate was filtered off, washed three times by reslurrying in 500 parts warm water, and dried at 100°. The solid cake of catalyst was broken up to 8–16 mesh British Standard sieve, and heated at 500° for 16 hours.

A gaseous mixture of 9.5% by volume of n-butane, 47.5% by volume of air, and 43% by volume of steam was passed over the catalyst in a reactor at 502°, the contact time being 4 seconds.

The organic part of the reactor exit gas was of the following composition, n-butane 90.2%, butene-1 3.6%, butene-2 6%, butadiene 0.5%.

Example 7

Vanadyl oxalate, formed by addition of oxalic acid dihydrate (15 parts) to a suspension of vanadium pentoxide (2 parts) in water (10 parts), was mixed with a solution of manganese acetate (5.4 parts) in water (20 parts), and the combined solutions used to impregnate 8–16 mesh BSS alumina (100 parts). The resulting catalyst was heated for 16 hours at 400° C. prior to use.

A gaseous mixture of 16.7% by volume of ethane, 8.3% by volume of oxygen, and 75% by volume of nitrogen, was passed over the catalyst in a reactor at 598° C. the contact time being 7 seconds. The yield of ethylene based on ethane fed was 20.5%.

Example 8

Oxalic acid dihydrate (220 parts) was added slowly to a suspension of vanadium pentoxide (22 parts) in water (60 parts), maintained at 90° C. A solution of stannous chloride dihydrate (27 parts) in water (30 parts) was added, and the mixed solution poured over 6–16 BBS mesh alumina (190 parts). Excess water was removed by heating at 90° C. for 3 hours, with stirring. The resulting catalyst was heated at 540° C. in a stream of air for 16 hours.

A gaseous mixture of 9.2% by volume of ethane, 4.6% by volume of oxygen, 43.6% by volume of nitrogen and 42.6% by volume of steam was passed over the catalyst at 555° C., the contact time being 4 seconds. The yield of ethylene obtained, based on ethane fed, was 6.6%.

Example 9

A solution of vanadyl oxalate, prepared by addition of 25 parts oxalic acid dihydrate to a slurry of 2.5 parts vanadium pentoxide in 4 parts water, was combined with a solution of 7.9 parts cobaltous acetate tetrahydrate in 20 parts water.

The resulting solution was added at 80° with stirring to 50 parts granular alumina (8–16 mesh), which was then dried at 100° prior to heating at 400° for 16 hours in a stream of air.

A gaseous mixture of 10% by volume of n-butane, 49% by volume of air, and 41% by volume of steam was passed over the catalyst in a reactor at 523° C., the contact time being 4 seconds.

The organic part of the reactor exit gas was of the following composition n-butane 88.2%, isobutane 1.5%, butene-1 3.6%, butene-2 6.2%, butadiene 0.5%.

Example 10

A solution of vanadyl oxalate prepared by addition of oxalic acid dihydrate (70 parts) to a suspension of vanadium pentoxide (7.5 parts) in water (18 parts) was added, slowly and with stirring, to microspheroidal alumina (150 parts). The impregnated solid was dried at 100° C., and heated at 400° C. for 14 hours, prior to being compound into ⅛" pellets.

A gaseous mixture of 10.2% by volume of ethane, 6.7% by volume of oxygen, 44.9% by volume of nitrogen, and 38.2% by volume of steam was passed over the catalyst in a reactor at 549° C., the contact time being 4 seconds. The yield of ethylene, based on ethane fed was 9.3%.

Example 11

100 parts of alumina (8/16 BSS mesh) was successively impregnated with solutions of (1) vanadyl oxalate (from 1 part of vanadium pentoxide) in 10 parts of water and (2) 5.34 parts of bismuth nitrate pentahydrate in 10 parts of 50% aqueous nitric acid. The resulting mass was dried at 100° C. and heated at 400° C. for 16 hours prior to use.

A gaseous mixture of 10% by volume of ethane, 10% by volume of oxygen, 40% by volume of nitrogen and 40% by volume of steam was passed over the catalyst in a reactor at 554° C. the contact time being 4 seconds. The yield of ethylene, based on ethane fed was 10.5%.

Example 12

100 parts of alumina (8/16 BSS mesh) was successively impregnated with solutions of (1) 2.75 parts tungstic acid in 12 parts of 50% aqueous ammonia and (2) vanadyl oxalate (from 1 part vanadium pentoxide) in 7 parts of water. The resulting mass was dried at 100° C. and heated at 400° for 16 hours prior to use.

A gaseous mixture of 10% by volume of ethane, 5% by volume of oxygen, 40% by volume of nitrogen and 40% by volume of steam was passed over the catalyst in a reactor at 552° C. the contact time being 4 seconds. The yield of ethylene based on ethane fed was 8.1%.

Example 13

50 parts of alumina (8/16 BSS mesh) was successively impregnated with solutions of (1) 4.6 parts of zinc nitrate hexahydrate in 12 parts of water and (2) vanadyl oxalate (from 1.2 parts vanadium pentoxide in 5 parts of water. The resulting mass was dried at 100° C. and then heated at 400° C. for 16 hours prior to use.

A gaseous mixture of 10.1% by volume of ethane, 4.7% by volume of oxygen, 43.6% by volume of nitrogen, and 41.6% by volume of steam was passed over the catalyst in a reactor at 548° C., the contact time being 3.5 seconds. The yield of ethylene based on ethane fed was 10.5%.

Example 14

50 parts of alumina (8/16 BSS mesh) was successively impregnated with solutions of (1) vanadyl oxalate (from 1.25 parts vanadium pentoxide) in 5 parts of water and (2) 2.1 parts of lead acetate tin hydrate in 15 parts of 50% aqueous acetic acid.

The resulting mass was dried at 100° C. for 4 hours, and heated at 400° C. for 16 hours prior to use.

A gaseous mixture of 11.6% by volume of ethane, 5.4% by volume of oxygen, 49% by volume of nitrogen and 34% by volume of steam was passed over the catalyst in a reactor at 549° C. the contact time being 4 seconds. The yield of ethylene based on ethane fed was 8.7%.

I claim:

1. A process for the production of an alkene which comprises reacting an alkane containing at least two carbon atoms at a temperature of from about 400 to about 650° C. in the vapor phase for a contact time of from about one to about thirty seconds with molecular oxygen over an oxidation catalyst selected from the group consisting of vanadates of tin, cobalt, chromium, manganese, uranium, tungsten, lead, bismuth and zinc to produce the corresponding alkene.

2. The process as claimed in claim 1 wherein the catalyst is cobalt vanadate.

3. The process as claimed in claim 1 wherein the catalyst is chromium vanadate.

4. The process as claimed in claim 1 wherein the catalyst is manganese vanadate.

5. The process as claimed in claim 1 wherein the catalyst is promoted by the incorporation of other metals selected from the group consisting of iron, potassium, cerium, nickel and cobalt.

6. The process as claimed in claim 1 wherein the catalyst is deposited on an inert support material.

7. The process as claimed in claim 6 wherein the inert support material is selected from the group consisting of silica, alumina and diatomaceous earth.

8. The process as claimed in claim 1 wherein the alkane is selected from the group consisting of ethane, butane, propane, isobutane, isopentane and dodecane.

9. The process as claimed in claim 1 wherein the concentration of alkane in the feed is about 10% by volume.

10. The process as claimed in claim 1 wherein a concentration of oxygen in the feed is about 10% by volume.

11. A process as claimed in claim 1 wherein the feed contains a gaseous diluent which is substantially inert to the conditions of reaction.

12. The process as claimed in claim 11 wherein the gaseous diluent is selected from the group consisting of nitrogen, steam and mixtures thereof.

References Cited by the Examiner

UNITED STATES PATENTS

| | | | |
|---|---|---|---|
| 1,517,968 | 12/1924 | Ellis | 260—604 |
| 2,265,948 | 12/1941 | Loder | 260—597 |
| 2,776,317 | 1/1957 | Reeder | 260—604 |
| 2,995,528 | 8/1961 | Dowden et al. | 260—604 |

ALPHONSO D. SULLIVAN, *Primary Examiner.*